(12) United States Patent
Arndt et al.

(10) Patent No.: US 7,979,548 B2
(45) Date of Patent: Jul. 12, 2011

(54) HARDWARE ENFORCEMENT OF LOGICAL PARTITIONING OF A CHANNEL ADAPTER'S RESOURCES IN A SYSTEM AREA NETWORK

(75) Inventors: Richard Louis Arndt, Austin, TX (US); Bruce Leroy Beukema, Hayfield, MN (US); David F. Craddock, New Paltz, NY (US); Ronald Edward Fuhs, Rochester, MN (US); Thomas Anthony Gregg, Highland, NY (US); Donald William Schmidt, Stone Ridge, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1741 days.

(21) Appl. No.: 10/674,985

(22) Filed: Sep. 30, 2003

(65) Prior Publication Data
US 2005/0071472 A1    Mar. 31, 2005

(51) Int. Cl.
*G06F 15/16* (2006.01)
(52) U.S. Cl. ...................................................... 709/226
(58) Field of Classification Search .................. 709/217, 709/220, 223, 225, 226, 245; 710/22, 28, 710/36
See application file for complete search history.

(56) References Cited

U.S. PATENT DOCUMENTS

| | | | | |
|---|---|---|---|---|
| 6,467,007 B1 * | 10/2002 | Armstrong et al. | ........... | 710/260 |
| 7,010,633 B2 * | 3/2006 | Arndt et al. | .................... | 710/243 |
| 7,283,473 B2 * | 10/2007 | Arndt et al. | .................... | 370/231 |
| 7,493,409 B2 * | 2/2009 | Craddock et al. | ............. | 709/238 |
| 2003/0018828 A1 * | 1/2003 | Craddock et al. | ............. | 709/321 |
| 2003/0212884 A1 * | 11/2003 | Lee et al. | .......................... | 713/1 |

* cited by examiner

*Primary Examiner* — William C Vaughn, Jr.
*Assistant Examiner* — Scott Christensen
(74) *Attorney, Agent, or Firm* — Yee & Associates, P.C.; Matthew W. Baca

(57) ABSTRACT

A method and system are disclosed for logically partitioning resources of a single channel adapter for use in a system area network. Each resource includes a partition identifier register within which is stored a partition identifier. A first one of the resources is assigned to a first partition by storing a first partition identifier in the partition identifier register within the first one of the resources. A second one of the resources is assigned to a second partition by storing a second partition identifier in the partition identifier register within the second one of the resources. Partitioning of the resources is enforced by permitting access to the first resource by only the first partition and permitting access to the second resource by only the second partition by checking the partition identifiers of each resource.

12 Claims, 13 Drawing Sheets

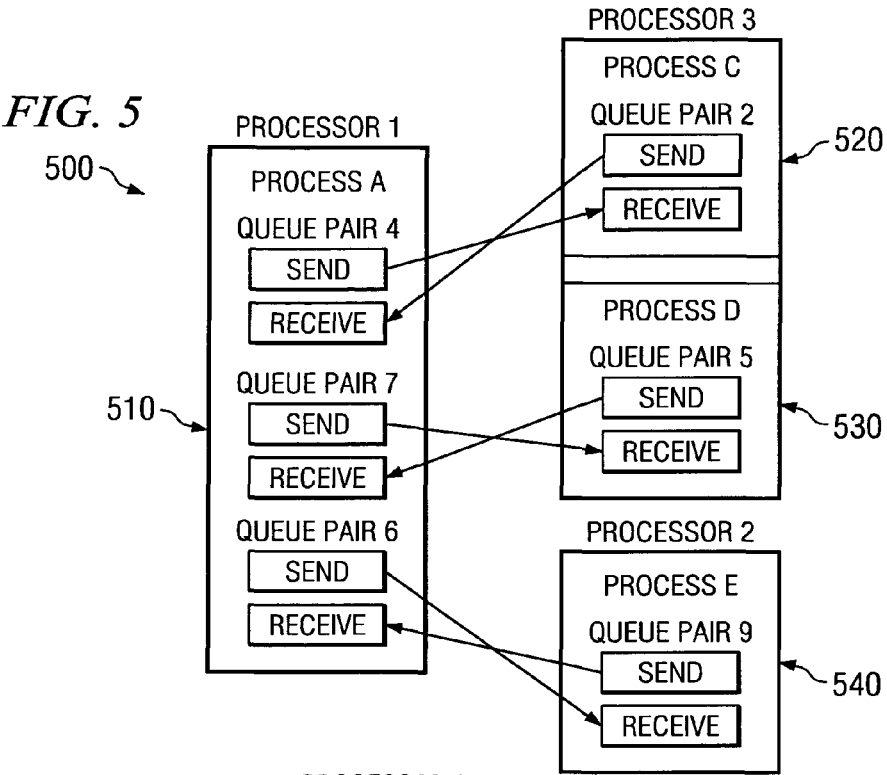
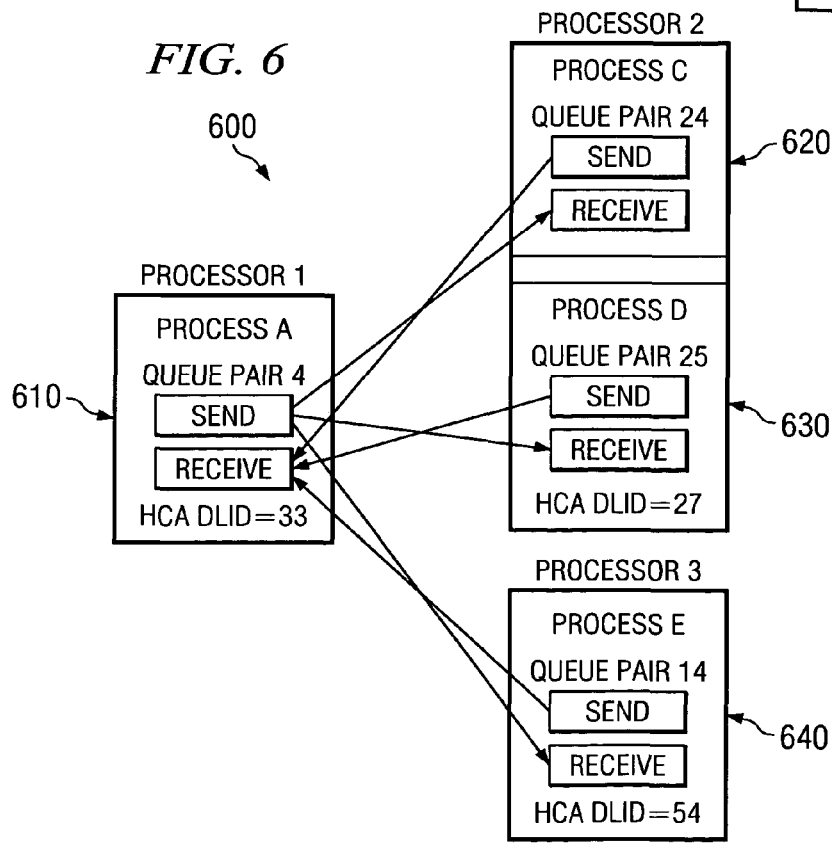

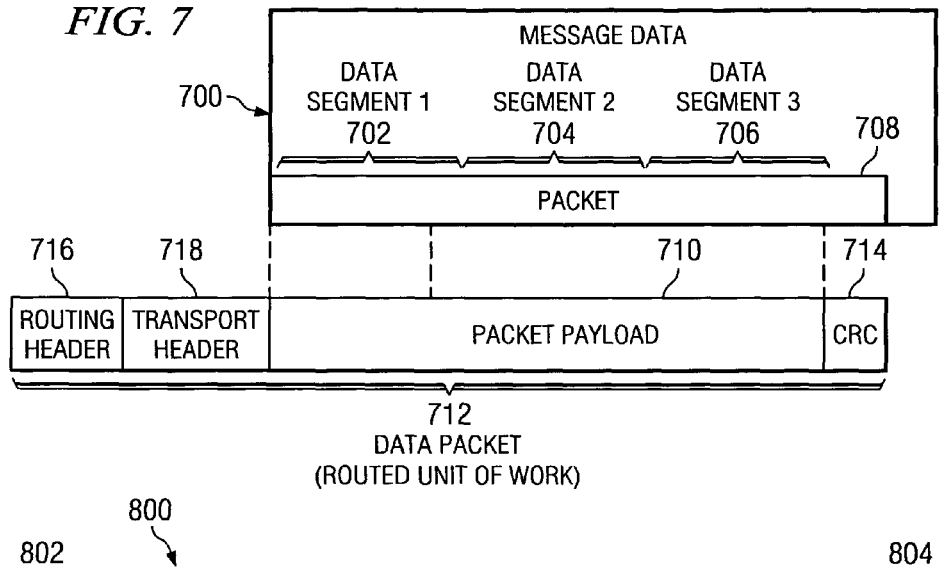
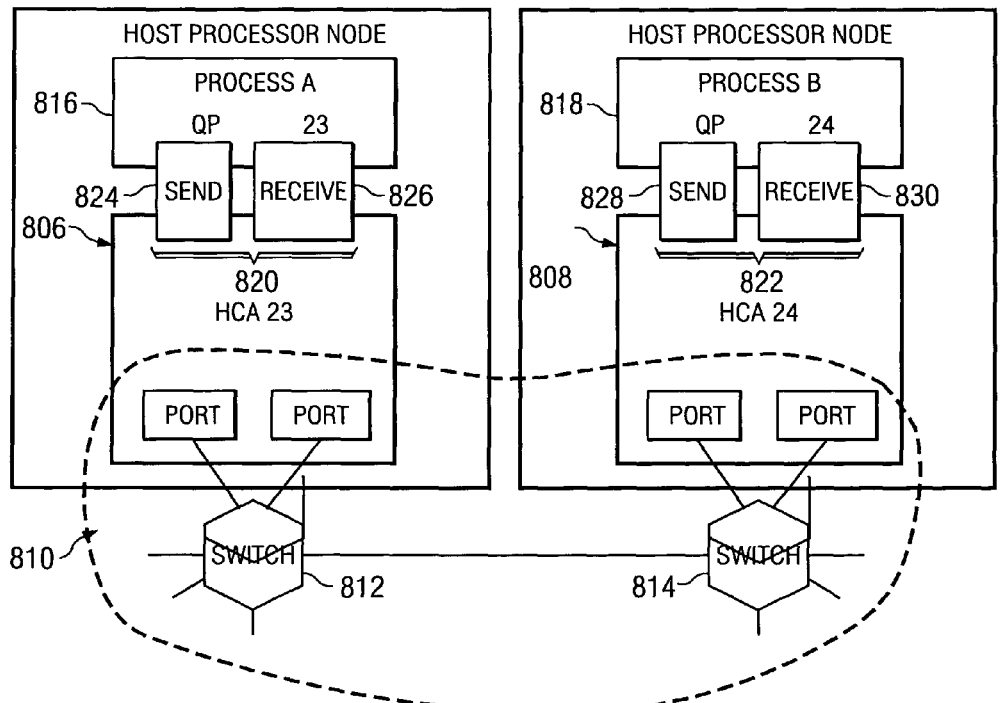

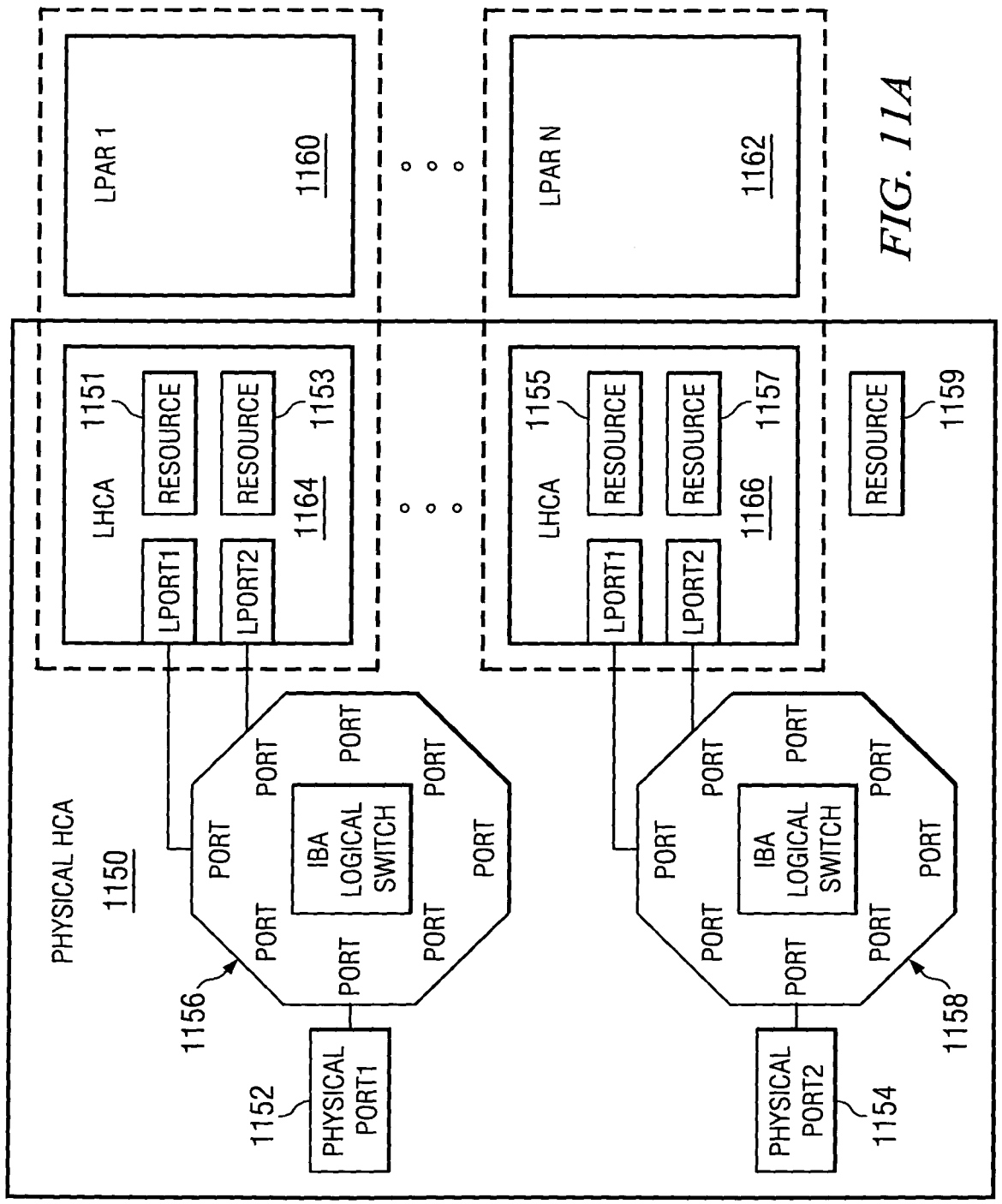

HARDWARE ENFORCEMENT OF LOGICAL PARTITIONING OF A CHANNEL ADAPTER'S RESOURCES IN A SYSTEM AREA NETWORK

BACKGROUND OF THE INVENTION

1. Technical Field

The present invention is directed to an improved data processing system. More specifically, the present invention provides a method and system for enforcing logical partitioning of resources of a single channel adapter using hardware.

2. Description of Related Art

In a System Area Network (SAN), such as an InfiniBand (IB) network, the hardware provides a message passing mechanism that can be used for Input/Output devices (I/O) and interprocess communications (IPC) among general computing nodes as well as within a single node. Processes executing on devices access SAN message passing hardware by posting send/receive messages to send/receive work queues on a SAN host channel adapter (HCA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Thus, with the SAN architecture described above, an Ethernet device driver can communicate with an Ethernet adapter by posting send/receive messages to a Host Channel Adapter (HCA) and retrieve the results of these messages through the HCA's Send and Receive Work Queues. The Ethernet adapter includes a Target Channel Adapter, which is the component that attaches to the SAN. Thus, to attach to a Local Area Network (LAN), such as an Internet Protocol (IP) and Ethernet network, an Ethernet adapter is needed as well as a switch or router that attaches the Ethernet adapter to the IP based LAN.

Often it is beneficial to logically partition the individual components within a system so as to support a plurality of operating system environments. Such logical partitioning allows each operating system, and applications operating within that operating system environment, to view the components of the system as being dedicated to that operating system environment even though, in actuality, the components are shared by a plurality of operating system environments. Such logical partitioning allows a system to support multiple different environments and thus, increases the versatility of the system while reducing the cost of maintaining the different environments by the sharing of components.

The InfiniBand architecture defines several types of resources within a channel adapter component. A channel adapter, such as a host or target channel adapter, includes multiple resources. These resources include queue pairs, completion queues, event queues, memory windows, and memory regions. In the prior art, an entire channel adapter component, including all of its internal resources, could be allocated to a single partition. However, when a channel adapter was allocated to a partition, all of that channel adapter's internal resources were also allocated to that single partition. Thus, when a particular channel adapter was allocated to a partition, all of the queue pairs, completion queues, event queues, memory windows, and memory regions that are included within the channel adapter are all also allocated to the same partition.

In the prior art, since an entire channel adapter may be assigned to and controlled by one operating system, the operating system has complete and direct control of the hardware. Thus, the operating system handles all of the I/O for all of its processes. The operating system makes sure that its different tasks do not interfere with each other. Therefore, an operating system may directly access the resources of a channel adapter to set and/or change pointer or register values.

Therefore, it would be beneficial to have a method and system for enforcing logical partitioning of the resources of a single channel adapter such individual resources within a single channel adapter could be assigned to different partitions.

SUMMARY OF THE INVENTION

A method and system are disclosed for logically partitioning resources of a single channel adapter for use in a system area network. The single channel adapter is shared by different partitions. A first one of the resources is assigned to a first partition. A second one of the resources is assigned to a second, different, partition. Partitioning of the resources is enforced by permitting access to the first resource by only the first partition and permitting access to the second resource by only the second partition. Thus, portions of the channel adapter are allocated to one partition while other portions of the same channel adapter are allocated to other partitions.

In a preferred embodiment, the system area network is an InfiniBand network. The present invention provides logical portioning support for channel adapters to allow multiple operating systems to share the resources of a single channel adapter, typically a host channel adapter (HCA).

The present invention ensures that each operating system is unaware that the HCA hardware resources are being shared with other operating systems and further guarantees that the individual operating systems are prevented from accessing HCA hardware resources which are associated with other operating systems.

With the present invention, the resources of the single channel adapter are logically partitioned through the use of hardware registers that are included within each one of the resources. Each resource includes within it its own hardware register. A partition identifier is then stored in a resource's hardware register. The partition identifier (also referred to below as an LPAR ID), identifies the partition to which the resource has been assigned.

The present invention provides for trusted code, referred to herein as a hypervisor, which controls all accesses to the hardware by software. All partitioning requests are filtered through the hypervisor. The hypervisor takes control each time any software attempts to access the hardware.

Only the trusted hypervisor software can access the hardware register in which a partition identifier is stored. Thus, only the hypervisor can set or alter the partition identifiers. Software, such as applications and operating systems, may directly access the other hardware registers within a resource when the software and the resource are both assigned to the same partition. In this manner, software may associate resources that are assigned to the same partition with one another by setting pointers within the resources.

The present invention describes determining whether resources are assigned to the same partition by checking each resource's partition identifier. If the partition identifiers stored in the resources match, the resources are assigned to the same partition.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a portion of a distributed computer system in accordance with a preferred embodiment of the present invention in which a reliable connection service is used;

FIG. 6 is a diagram illustrating a portion of a distributed computer system in accordance with a preferred embodiment of the present invention in which reliable datagram service connections are used;

FIG. 7 is an illustration of a data packet in accordance with a preferred embodiment of the present invention;

FIG. 8 is a diagram illustrating a portion of a distributed computer system in accordance with a preferred embodiment of the present invention;

FIG. 11A depicts a Host Channel Adapter in a Logical Partitioning environment in accordance with a preferred embodiment of the present invention;

DETAILED DESCRIPTION OF THE PREFERRED EMBODIMENTS

Figure 1:
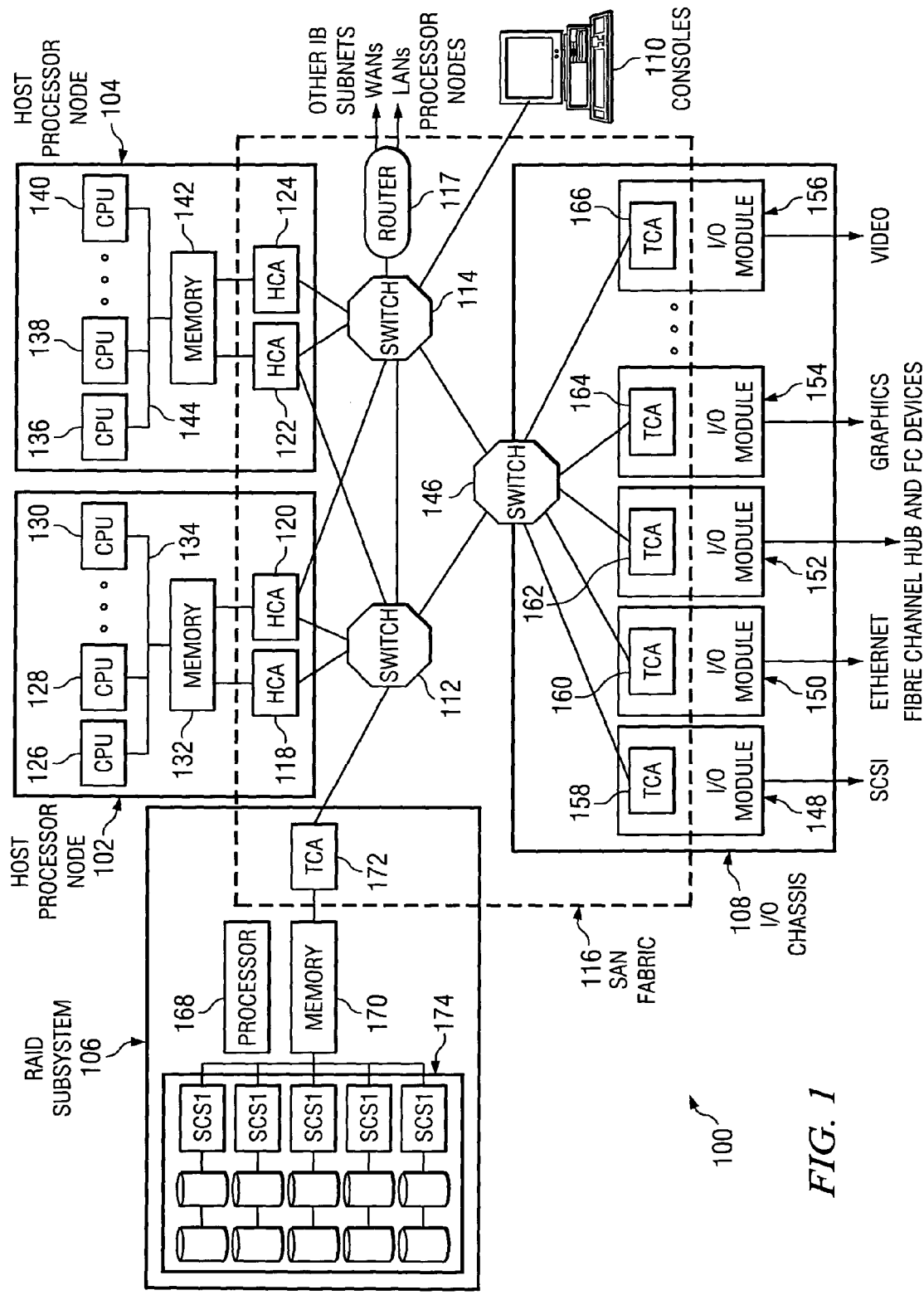
FIG. 1 is a diagram of a distributed computer system in accordance with a preferred embodiment of the present invention.

Logically partitioned (LPAR) environments are coming into general use in all sizes of servers in order to allow a single hardware platform to serve more than one operating system (OS) simultaneously. These operating systems may be multiple copies of the same OS, copies of the same OS at different versions, or different operating systems entirely. When an InfiniBand (IB) host channel adapter (HCA) is used on one of the systems, it is highly beneficial to be able to provide a virtualization environment that allows this single HCA to be used by multiple different partitions.

Critical to partitioned environments is the ability to isolate software problems in one partition from impacting the operation of software in any other partition. One technique that has been used is to give the control of all hardware to a single highly trusted set of firmware called the hypervisor. Thus, all partitioning requests are filtered through the hypervisor. This technique does affect the performance of the entire system, however, because the hypervisor must take control each time any software attempts to access the hardware.

At any one time, the various hardware resources within a single channel adapter may be logically associated with each other in order to construct a logical context for I/O operations. In order to logically associate one resource with another, pointers are stored in registers of the resources that point to the associated resource. Thus, a pointer is stored within a first resource that points to the second resource that is associated with this first resource.

The present invention provides for the addition of a new hardware register, referred to herein as an LPAR ID register, within each resource in which to store an identifier that identifies the particular partition to which the resource is allocated or assigned. In this manner, resources within a single channel adapter may be assigned to different partitions. For example, one resource may be assigned to a first partition by storing a partition identifier that identifies the first partition in the LPAR ID register of the first resource. A second resource within the same channel adapter may be assigned to a second partition by storing a partition identifier that identifies the second partition in the LPAR ID register of the second resource.

The value stored in the LPAR ID register of a particular resource is settable only by the hypervisor. This value is typically set when the hypervisor selects and configures the resource. The partition identifier permits the hardware to enforce partitioning of the various resources within a channel adapter. The resources of a single channel adapter may be assigned to different partitions. In this manner, the hardware can ensure that operating systems and resources that are assigned to one partition do not access resources that are assigned to a different partition. The hypervisor is not needed to enforce this partitioning. The channel adapter itself enforces the partitioning by comparing the partition identifiers that are stored in the resources.

Only the hypervisor may access the LPAR ID registers. The operating system is prohibiting from accessing these registers. Once a resource is assigned to a particular partition by setting a partition identifier in the LPAR ID register, the operating system will have access to the remaining components of the resource, such as the pointers within the resources that are used to associate one resource with another.

These pointers are set by the hypervisor when the resource is allocated to an LPAR (and thus the OS). Once these pointers are set, the resources may freely access one another independently from either the operating system or hypervisor using these pointers. Logical partitioning of the resources is enforced by the partition identifiers stored in each resource while these resources are accessing one another. Thus, when one resource attempts to access another, the access will be permitted when the resources are assigned to the same partition, and will be prohibited if the resources are assigned to different partitions.

Thus, each partition has a group of dedicated resources that are identified using the partition identifier that is stored in the LPAR ID registers of each resource. As each resource is accessed, partitioning is enforced using these partition identifiers by permitting resources having a particular partition identifier stored in its LPAR ID register to access only those other resources that also have the same particular partition identifier stored in their LPAR ID registers.

The preferred embodiments of the present invention will be described in terms of the InfiniBand architecture which is one possible system area network in which the present invention may be used. Therefore, a description of the InfiniBand network will first be provided with regard to FIGS. 1-11A.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes. The embodiments of the present invention described below can be implemented in any one or more of the channel adapters depicted below.

Computer systems implementing the present invention which include the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

A host channel adapter is implemented in hardware. The host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination process's communication port, but does not specify where in the destination process's memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process.

In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
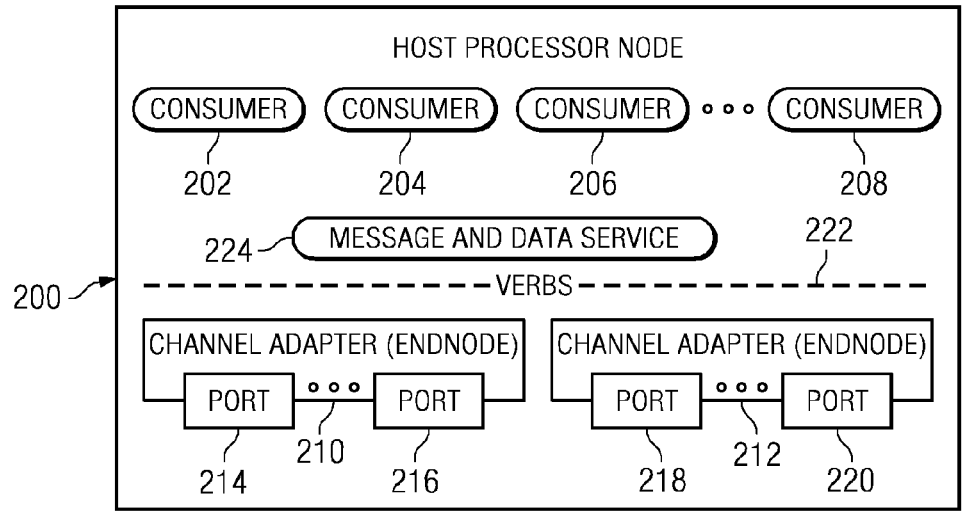
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3A:
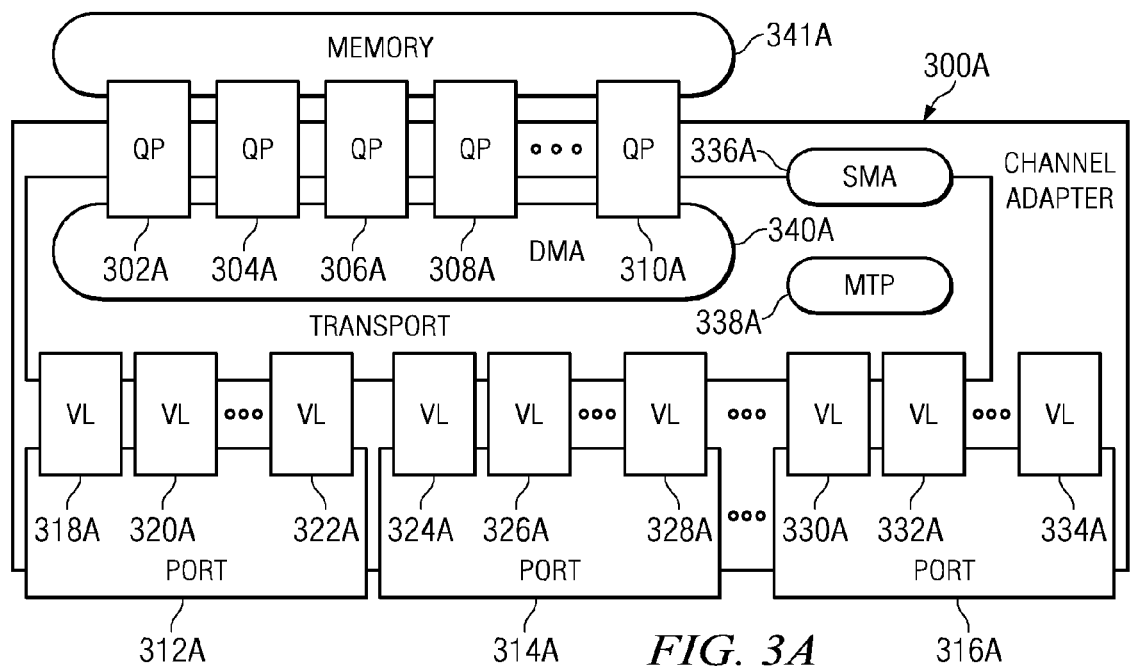
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A-310A, which are used to transfer messages to the host channel adapter ports 312A-316A.

Buffering of data to host channel adapter ports 312A-316A is channeled through virtual lanes (VL) 318A-334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights.

Direct memory access (DMA) 340A provides for direct memory access operations using memory 340A with respect to queue pairs 302A-310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel and semantic messages. A consumer calls an operating-system specific programming interface, which is herein referred to as verbs, to place work requests (WRs) onto a work queue.

Figure 3B:
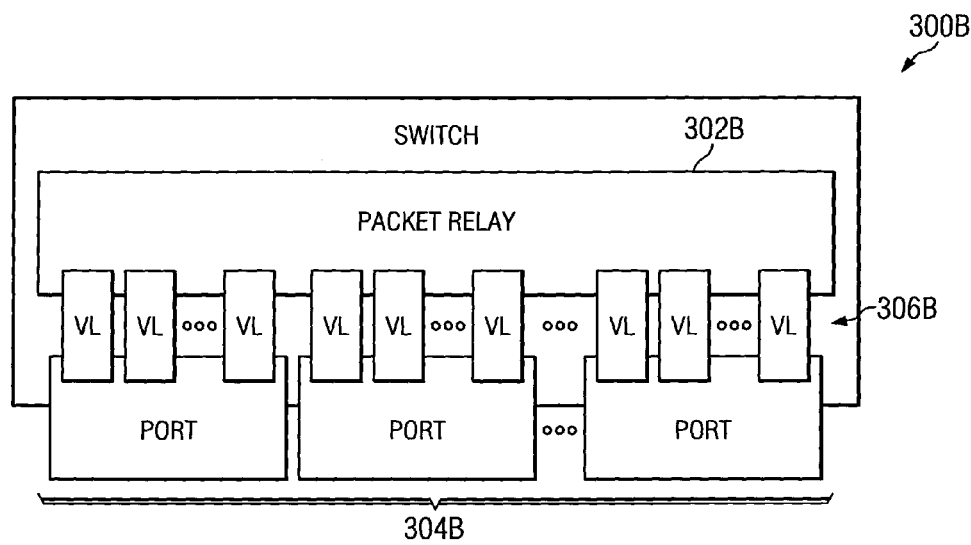
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
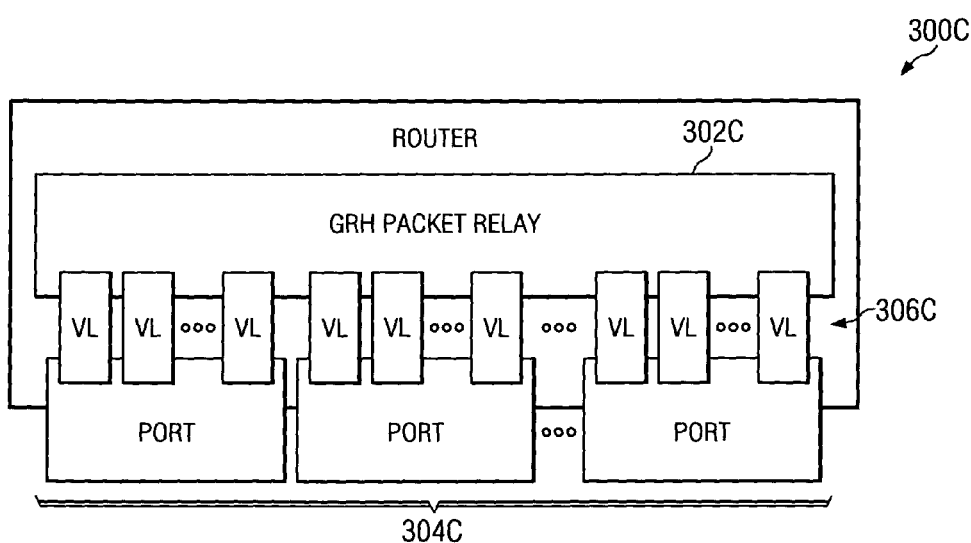
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured that the loops will not cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
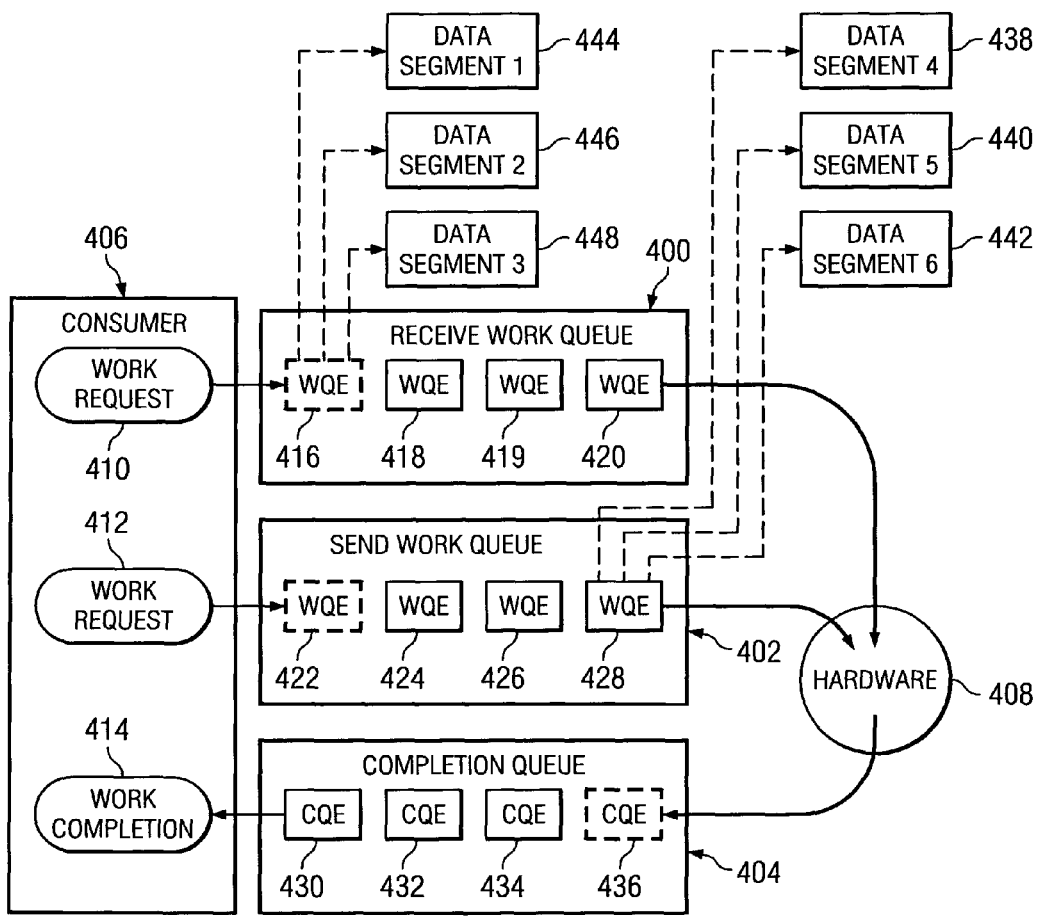
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQES) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 3 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process E 540. And, host processor node 2 includes a process C 520 and a process D 530.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion.

If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport header 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

In FIG. 8, a portion of a distributed computer system is depicted to illustrate an example request and acknowledgment transaction. The distributed computer system 800 in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A 816. Host processor node 804 includes a client process B 818. Client process A 816 interacts with host channel adapter hardware 806 through queue pair 820. Client process B 818 interacts with hardware channel adapter hardware 808 through queue pair 822. Queue pairs 824 and 828 are data structures that each include a send work queue and a receive work queue. Thus, queue pair 820 includes send work queue 824 and receive work queue 826. Queue pair 828 includes send work queue 828 and receive work queue 830.

Process A initiates a message request by posting work queue elements to the send queue 824 of queue pair 820. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
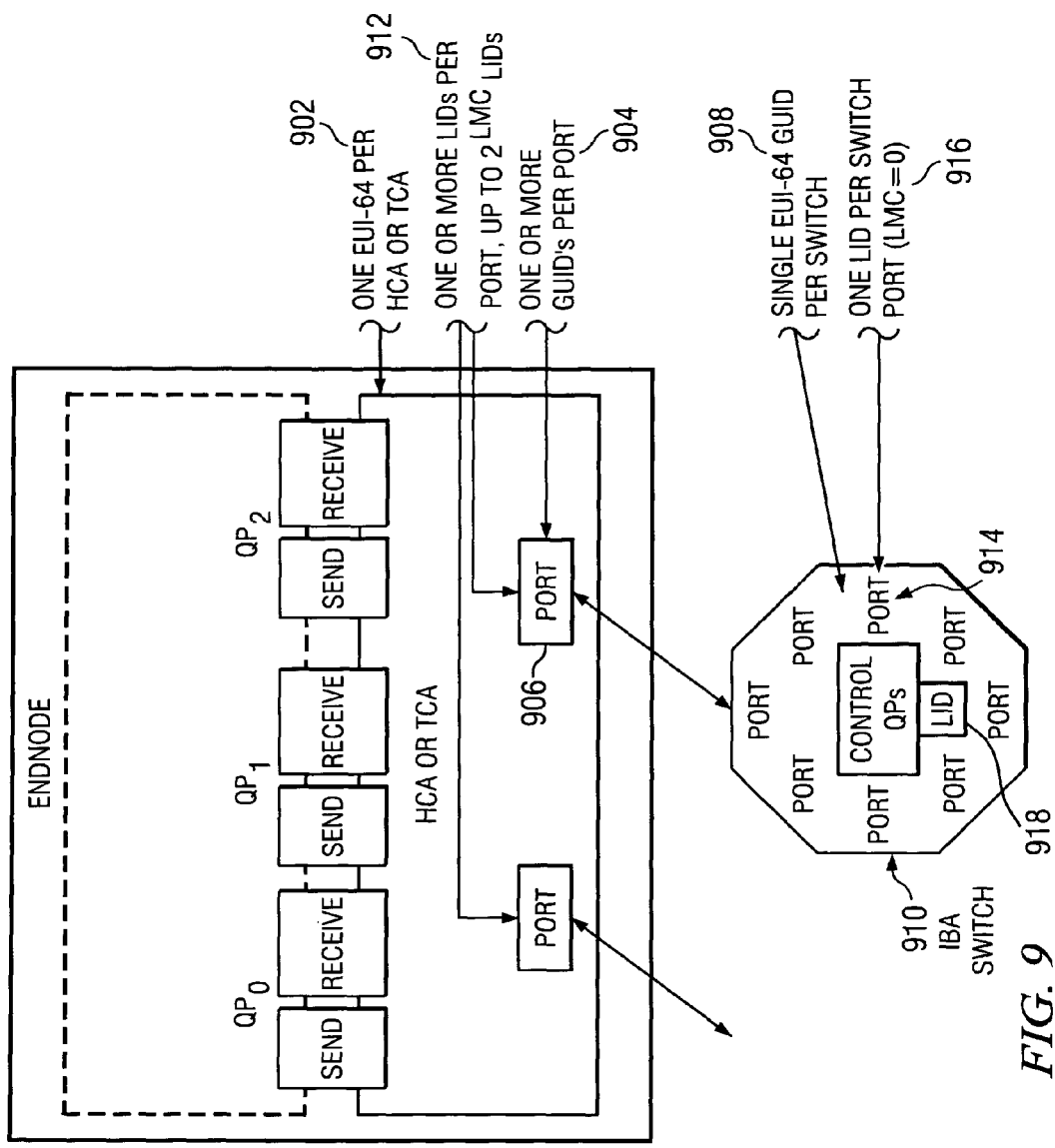
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name.

Thus, there is one host name per node, but a node can have multiple channel adapters (CAs).

A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data. Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. Each switch 910 has one LID 918 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
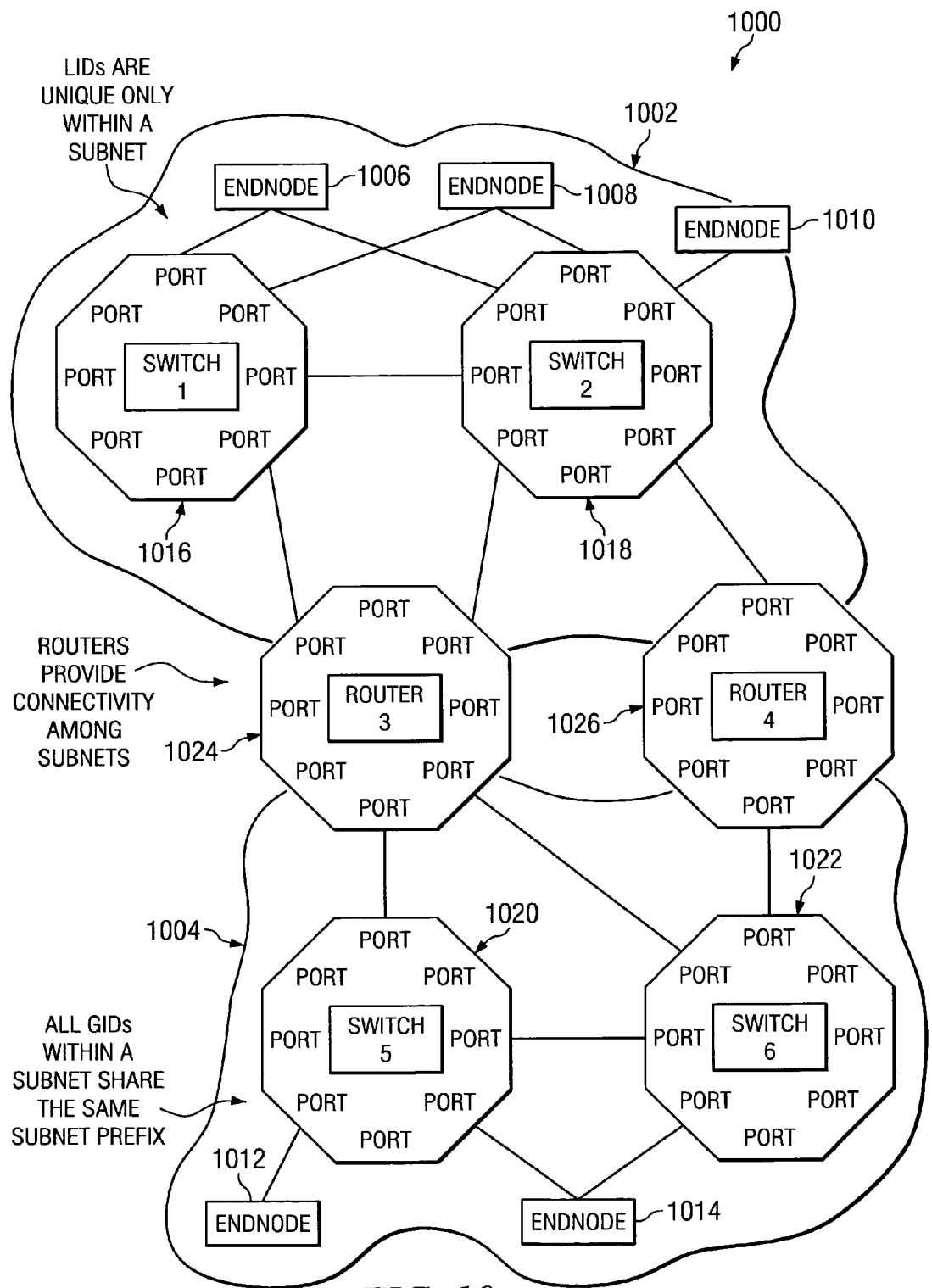
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
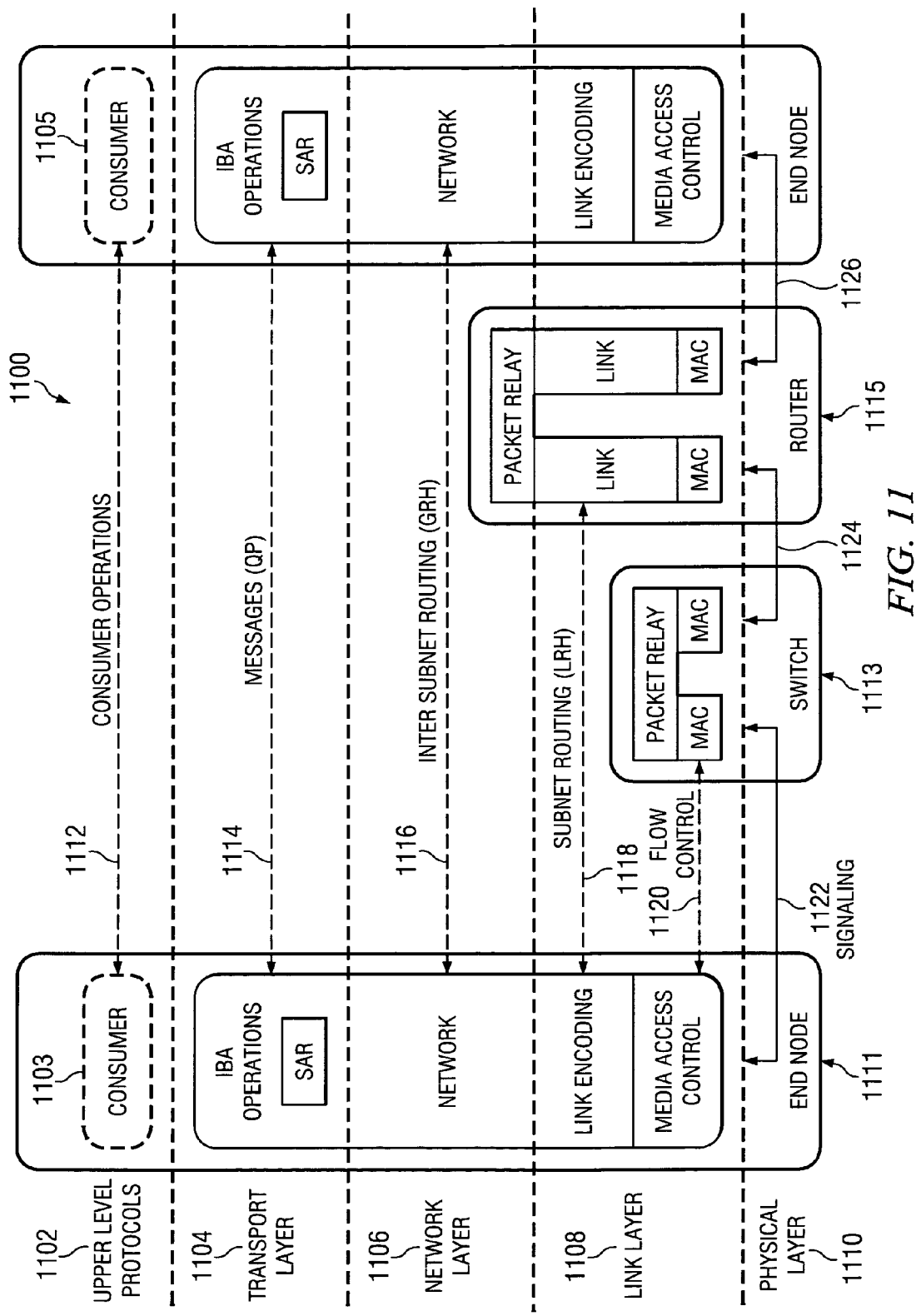
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adaptor endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides three types of transport services as described above which are reliable connection service; reliable datagram service; and unreliable datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

As previously mentioned, the present invention is directed to an improved method and system for use with a system area network, such as an InfiniBand network, in which different resources within a single host channel adapter (HCA) of the system area network may be assigned and used by different logical partitions. With the logical partitioning support for the resources of the HCAs provided by the present invention, multiple operating systems may share a single physical HCA. Logical partitioning ensures that each operating system is unaware that the various resources of the single HCA hardware are being shared with other operating systems and further guarantees that the individual operating systems and applications of a particular partition are prevented from accessing HCA hardware resources which are associated with other partitions.

FIG. 11A depicts a Host Channel Adapter in a Logical Partitioning environment in accordance with a preferred embodiment of the present invention. The physical HCA 1150 includes multiple resources, such as resources 1151, 1153, 1155, 1157, and 1159. The physical HCA 1150 includes physical port1 1152 and physical port2 1154. A person of ordinary skill in the art will recognize that physical HCA 1150 may include more or fewer ports depending on the implementation. The physical HCA also includes logical switches 1156, 1158.

Physical HCA 1150 is associated with a plurality of Logical Partitions, LPAR 1 1160 to LPAR N 1162. The LPARs are associated with Logical Host Channel Adapters, LHCA 1 1164 to LHCA N 1166.

The resources of physical HCA 1150 may be allocated or assigned to one of the logical partitions. For example, resources 1151 and 1153 are assigned to logical partition 1160. Resources 1155 and 1157 are assigned to logical partition 1162. Resource 1159 is not allocated or assigned to any partition.

Figure 12:
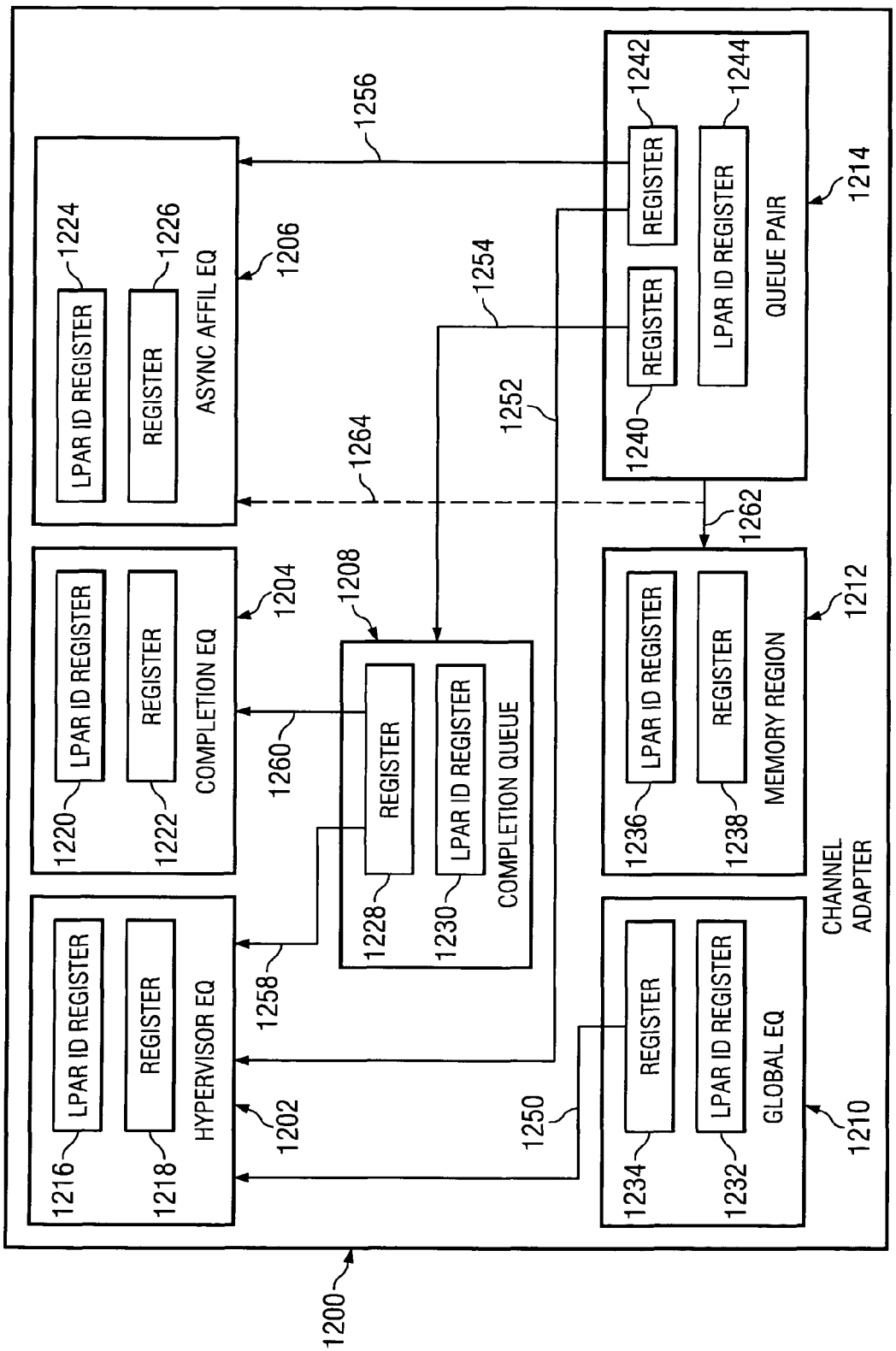
FIG. 12 is an exemplary diagram of a physical host channel adapter including a logical partitioning register for storing a logical partition identifier in each resource within the channel adapter in accordance with the present invention.

FIG. 12 is an exemplary diagram of a physical host channel adapter including a logical partitioning register for storing a logical partition identifier in each resource within the channel adapter in accordance with the present invention. The host channel adapter shown in FIG. 12 corresponds to the host channel adapter illustrated in FIG. 3A but with the enhancements of the present invention to provide for logical partitioning support of the resources within the host channel adapter.

As shown in FIG. 12, the host channel adapter (HCA) 1200 includes a hypervisor event queue (EQ) 1202, a completion event queue 1204, an asynchronous affiliated (ASYNC AFFIL) error event queue 1206, a completion queue 1208, a global event queue 1210, a memory region 1212, and a queue pair 1214. Those skilled in the art will recognize that multiple different instances of one or more of these resources may be included within a single channel adapter. For example, one channel adapter might include dozens of different queue pairs that are each configured similarly to queue pair 1214.

According to the present invention, resources may access one another so long as both resources are assigned to the same logical partition. The present invention enforces this partitioning using the partition identifier stored in the LPAR ID field of each resource. When both resources have the same partition identifier stored, the resources are free to access one another. When they have different partition identifiers stored, i.e. they are allocated to different partitions, they are not allowed to access one another.

Hypervisor EQ 1202 includes a partition identifier register, LPAR ID register, 1216, and a register 1218. Completion EQ 1204 includes LPAR ID register 1220 and a register 1222. ASYNC AFFIL EQ 1206 includes LPAR ID register 1224 and register 1226. Completion queue 1208 includes register 1228 and LPAR ID register 1230. Global EQ 1210 includes LPAR ID register 1232 and register 1234. Memory region 1212 includes LPAR ID register 1236 and register 1238. Queue pair 1214 includes register 1240, register 1242, and LPAR ID register 1244.

Each resource may include one or more registers, such as registers 1218, 1222, 1226, 1228, 1234, 1238, 1240, and 1242, for storing pointers to other resources or other information. Each resource also includes a partition identifier register, such as 1216, 1220, 1224, 1230, 1232, 1236, and 1244, for storing an identifier that identifies the partition to which the particular resource is allocated. For example, LPAR ID register 1216 stores an identifier that identifies the partition to which Hypervisor EQ 1202 is allocated. Typically, the hypervisor is assigned a specific partition identifier, such as either FF or 00.

LPAR ID register 1220 stores an identifier that identifies the partition to which Completion EQ 1204 is allocated. LPAR ID register 1224 stores an identifier that identifies the partition to which ASYNC AFFIL EQ 1206 is allocated. LPAR ID register 1230 stores an identifier that identifies the partition to which Completion queue 1208 is allocated. LPAR ID register 1232 stores an identifier that identifies the partition to which Global EQ 1210 is allocated. LPAR ID register 1236 stores an identifier that identifies the partition to which Memory Region 1212 is allocated. And, LPAR ID register 1244 stores an identifier that identifies the partition to which Queue Pair 1214 is allocated.

The registers of the resources establish the following relationships:

(1) There is a completion queue number (CQ#) for queue pairs. The CQ number identifies the CQ that the HCA uses to post completion events for the queue pair.

(2) There is an event queue number (EQ#) for queue pairs. The EQ number identifies the event queue that the channel adapter uses to post affiliated asynchronous events for the related queue pair.

(3) There is an event queue number (EQ#) for the completion queue. The EQ number identifies the EQ that the channel adapter uses to post a completion queue entry (CQE) event for the completion queue.

(4) The relationship between the queue pairs and memory regions is determined by the index portion of the L_Key in the data segment of a queue pair's work queue element (WQE) or the R_Key in a received RDMA packet.

Each time the channel adapter uses one of these relationships to bridge from one resource to another, the channel adapter compares the partition identifier of the initiating resource to the partition identifier of the target resource. If the partition identifiers match, processing is allowed to continue and the first resource is allowed to access the second resource. If the partition identifiers do not match, errors are detected and reported as described below:

(1) When a queue pair accesses its completion queue for a completion event and the partition identifiers do not match, the OS that set the CQ# in the queue pair is most likely in error. In this case, either the hypervisor can be alerted through an event on the hypervisor's event queue, as depicted in FIG. 12, or an event can be generated for the operating system.

(2) When a queue pair accesses its event queue for an affiliated asynchronous error and the partition identifiers do not match, the OS that set the EQ# in the queue pair is most likely in error. In this case, either the hypervisor can be alerted through an event on the hypervisor's event queue, as depicted in FIG. 12, or an event can be generated for the operating system.

(3) When a completion queue accesses its event queue and the partition identifiers do not match, the operating system that set the EQ# in the completion queue is most likely in error. In this case, either the hypervisor can be alerted through an event on the hypervisor's event queue, as depicted in FIG. 12, or an event can be generated for the operating system.

(4) When the L_Key or R_Key points to a memory region whose partition identifier does not match the associated queue pair's partition identifier, the user software responsible for generating the Key is most likely in error. In this case, the OS owning the user software is alerted by an event on the queue pair's event queue, which is the same event queue used for asynchronous affiliated events.

Global events EQ 1210 generates hypervisor events that are stored in Hypervisor EQ 1202 as depicted by signal 1250. These events include events such as port changes and port errors. Queue pair 1214 generates hypervisor events, depicted by signal 1252. A hypervisor event is generated by Queue pair 1214 when the identifier stored in LPAR ID register 1244 does not match the identifier stored in LPAR ID register 1220. A hypervisor event is also generated by Queue pair 1214 when the identifier stored in LPAR ID register 1244 does not match the identifier stored in LPAR ID register 1224.

When the identifier stored in LPAR ID register 1244 does match the identifier stored in LPAR ID register 1230, a normal completion event is stored in completion queue 1208, as depicted by signal 1254.

When the identifier stored in LPAR ID register 1230 does match the identifier stored in LPAR ID register 1220, a normal completion event is stored in Completion EQ 1204, as depicted by signal 1260. Completion queue 1208 generates a hypervisor event, as depicted by signal 1258, when the identifier stored in LPAR ID register 1230 does not match the identifier stored in LPAR ID register 1220.

Queue pair 1214 also generates asynchronous affiliated events, depicted by signal 1256. Queue pair 1214 checks LPAR ID register 1236, as illustrated by signal 1262. Queue pair 1214 generates asynchronous affiliated events, depicted by signal 1264 when an asynchronous affiliated error occurs and when the identifier stored in memory region LPAR ID register 1236 does not match the identifier stored in LPAR ID register 1244.

The value in each LPAR ID register is settable only by the hypervisor. When an operating system requests a particular type of resource within a particular channel adapter, the hypervisor selects a resource of the particular type, configures the resource, and sets the value in that resource's LPAR ID register to identify the partition to which the requesting operating system is assigned. Thereafter, the operating system may access that resource directly and alter the pointers that are stored in registers within the resource. In this manner, the channel adapter hardware performs the checks that are necessary in order to enforce the partitioning of the various resources of a particular channel adapter.

Figure 13:
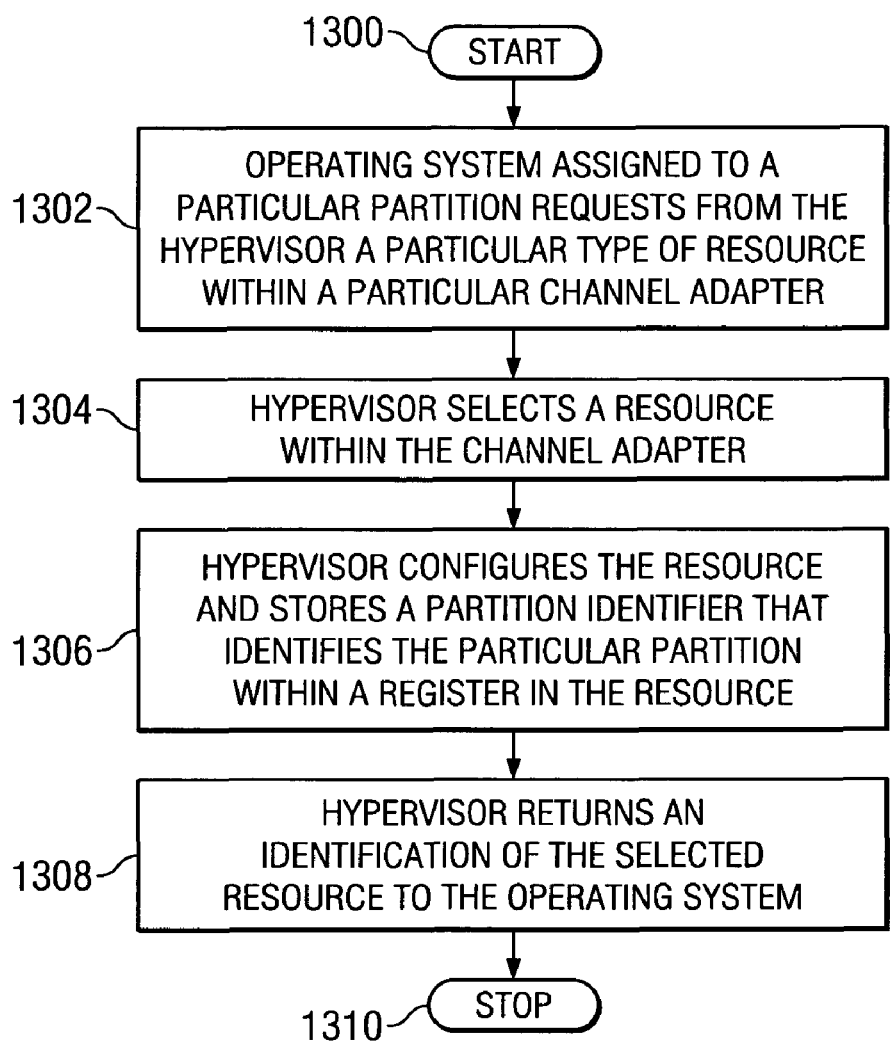
FIG. 13 depicts a high level flow chart which illustrates a hypervisor assigning a channel adapter's resource to a particular partition utilizing a partition identifier register in the resource in accordance with the present invention.

FIG. 13 depicts a high level flow chart which illustrates a hypervisor assigning a channel adapter's resource to a particular partition utilizing a partition identifier register in the resource in accordance with the present invention. The process starts as depicted by block 1300 and thereafter passes to block 1302 which illustrates an operating system requesting a particular type of resource within a particular channel adapter.

The operating system makes the request with the hypervisor. The operating system is assigned to a particular partition.

Next, block 1304 depicts the hypervisor selecting a particular resource of the requested type from the particular channel adapter. Thereafter, block 1306 illustrates the hypervisor configuring the selected resource for use. Also, the hypervisor stores the partition identifier that identifies the operating system's partition in the partition identifier register that is within the selected resource. Block 1308, then, depicts the hypervisor returning to the operating system an identifier that identifies the particular selected resource. The process then terminates as illustrated by block 1310.

Figure 14:
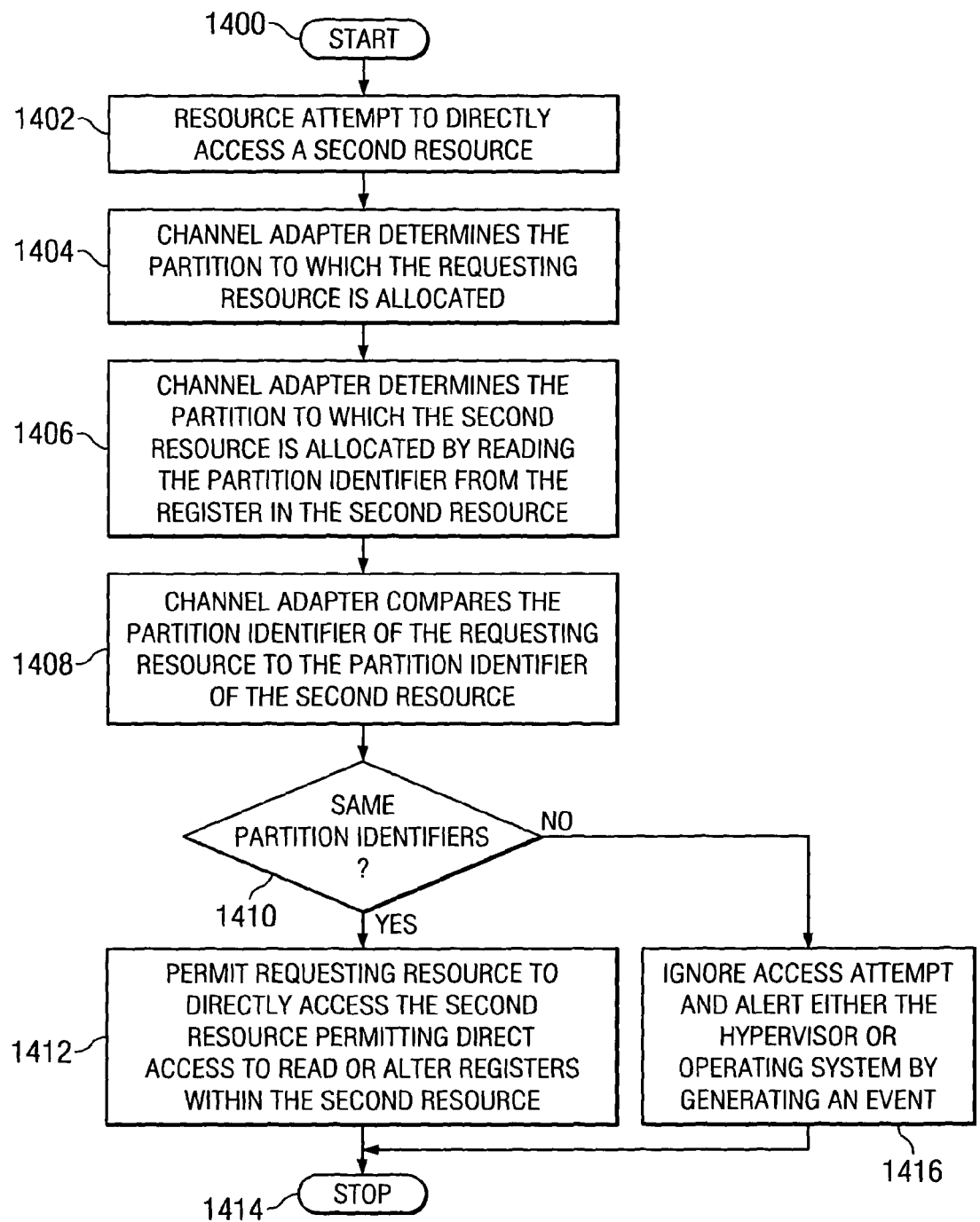
FIG. 14 depicts a high level flow chart that illustrates a channel adapter enforcing the partitioning of its resources in accordance with the present invention.

FIG. 14 depicts a high level flow chart that illustrates a channel adapter enforcing the partitioning of its resources in accordance with the present invention. The process starts as depicted by block 1400 and thereafter passes to block 1402 which illustrates a resource attempting to access a second resource. Next, block 1404 depicts the channel adapter that includes the second resource determining the partition to which the requesting resource is allocated. If a first resource is attempting to access a second resource, the channel adapter that includes the second resource determines to which partition the first resource is allocated. The channel adapter makes this determination by reading the partition identifier that is stored within the partition identifier register of the first resource.

Thereafter, block 1406 illustrates the channel adapter determining the partition to which the second resource is allocated by reading the partition identifier that is stored in the second resource's partition identifier register. Block 1408, then, depicts the channel adapter comparing the partition identifier of the requesting, or first, resource to the partition identifier of the second resource. Next, block 1410 illustrates a determination of whether or not the partition identifiers identify the same partition. If they identify the same partition, the process passes to block 1412 which depicts the channel adapter permitting the requesting resource to access the second resource. The process then terminates as illustrated by block 1414.

Referring again to block 1410, if a determination is made that the partition identifiers identify different partitions, the process passes to block 1416 which depicts the channel adapter prohibiting access by ignoring the access attempt and alerting either the hypervisor or operating system by generating either a hypervisor event or an operating system event. The process then terminates as illustrated by block 1414.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of logically partitioning a plurality of resources, comprising:

providing a single hardware channel adapter included in a System Area Network (SAN), said single hardware channel adapter comprising said plurality of resources, wherein said single hardware channel adapter is shared by different partitions, and wherein at least a first of the plurality of resources is assigned to a first partition and at least a second one of the plurality of resources is assigned to a second, different partition;

storing, by a hypervisor, a first partition identifier that identifies the first partition in a first hardware register that is included within the at least the first one of the plurality of resources, wherein the at least the first one of the plurality of resources is assigned to the first partition; and enforcing, by the hardware channel adapter, partitioning of the plurality of resources by allowing only third ones of the plurality of resources that have the first partition identifier stored in a hardware register that is included within the third ones of the plurality of resources to access the at least the first one of the plurality of resources, wherein fourth ones of the plurality of resources that do not have the first partition identifier stored in a hardware register that is included within the fourth ones of the plurality of partitions cannot access the first one of the plurality of resources, and wherein the fourth ones of the plurality of resources include the at least the second one of the plurality of resources;

wherein the hardware channel adapter is included in a node that includes a central processing unit, and wherein the hardware channel adapter couples the central processing unit to a switch;

requesting, by an operating system, a particular one of said plurality of resources of a particular type, wherein the operating system is assigned to a particular partition;

responsive to the request, selecting, by the hypervisor, a particular one of said plurality of resources that is said particular type;

responsive to the selection, determining a particular one of the partitions to which said operating system is assigned; and responsive to the determination, storing, by the hypervisor, a particular partition identifier that identifies said particular one of the partitions in a hardware register within said particular one of said plurality of resources.

2. The method according to claim 1, further comprising the steps of:

attempting, by a fifth one of the plurality of resources, to access the at least the first one of the plurality of resources;

comparing, by the hardware channel adapter, a second partition identifier that is stored in a second hardware register that is included in the fifth one of the plurality of resources to the first partition identifier;

allowing, by the hardware channel adapter, the fifth one of the plurality of resources to access the at least the first one of the plurality of resources responsive to the second partition identifier matching the first partition identifier; and ignoring, by the hardware channel adapter, the attempt by the fifth one of the plurality of resources to access the at least the first one of the plurality of resources responsive to the second partition identifier not matching the first partition identifier, wherein the fifth one of the plurality of resources cannot access the at least the first one of the plurality of resources, and wherein the fifth one of the plurality of resources is assigned to the second partition.

3. The method according to claim 1, further comprising the step of:

permitting only said hypervisor to alter contents of said hardware register.

4. The method according to claim 1, further comprising the step of:

enforcing said partitioning using hardware within said hardware channel adapter.

5. The method according to claim 1, wherein the hardware channel adapter is included in a fabric.

6. The method according to claim 1, wherein the System Area Network (SAN) is an InfiniBand (IB) network.

7. A system of logically partitioning a plurality of resources, comprising:

a single hardware channel adapter included in a System Area Network (SAN), said single hardware channel adapter comprising said plurality of resources, wherein said single hardware channel adapter is shared by different partitions, and wherein at least a first of the plurality of resources is assigned to a first partition and at least a second one of the plurality of resources is assigned to a second, different partition;

a hypervisor configured to store a first partition identifier that identifies the first partition in a first hardware register that is included within the at least the first one of the plurality of resources, wherein the at least the first one of the plurality of resources is assigned to the first partition; and wherein the hardware channel adapter is configured to enforce partitioning of the plurality of resources by allowing only third ones of the plurality of resources that have the first partition identifier stored in a hardware register that is included within the third ones of the plurality of resources to access the at least the first one of the plurality of resources, wherein fourth ones of the plurality of resources that do not have the first partition identifier stored in a hardware register that is included within the fourth ones of the plurality of resources cannot access the first one of the plurality of resources, and wherein the fourth ones of the plurality of resources include the at least the second one of the plurality of resources;

wherein the hardware channel adapter is included in a node that includes a central processing unit, and wherein the hardware channel adapter couples the central processing unit to a switch; and an operating system configured to request a particular one of said plurality of resources of a particular type;

wherein the hypervisor is configured to select a particular one of said plurality of resources that is said particular type responsive to the request;

wherein said hardware channel adapter is configured to determine a particular one of the partitions to which said operating system is assigned responsive to the selection; and wherein said hypervisor is configured to store a particular partition identifier that identifies said particular one of the partitions in a particular hardware register that is included within said particular one of said plurality of resources responsive to the determination.

8. The system according to claim 7, further comprising:

a fifth one of the plurality of resources attempting to access the at least the first one of the plurality of resources;

the hardware channel adapter comparing a second partition identifier that is stored in a second hardware register that is included in the fifth one of the plurality of resources to the first partition identifier;

the hardware channel adapter allowing the fifth one of the plurality of resources to access the at least the first one of the plurality of resources responsive to the second partition identifier matching the first partition identifier; and the hardware channel adapter ignoring the attempt by the fifth one of the plurality of resources to access the at least the first one of the plurality of resources responsive to the second partition identifier not matching the first partition identifier, wherein the fifth one of the plurality of resources cannot access the at least the first one of the plurality of resources, and wherein the fifth one of the plurality of resources is assigned to the second partition.

9. The system according to claim 7, further comprising:
said hardware channel adapter permitting only said hypervisor to alter contents of said hardware register.

10. The system according to claim 7, further comprising:
said hardware channel adapter enforcing said partitioning using hardware within said channel adapter.

11. The system according to claim 7, wherein the hardware channel adapter is included in a fabric.

12. The system according to claim 7, wherein the System Area Network (SAN) is an InfiniBand (IB) network.

* * * * *